US006640733B2

United States Patent
Huffmeyer

(10) Patent No.: US 6,640,733 B2
(45) Date of Patent: *Nov. 4, 2003

(54) INCLINOMETER-CONTROLLED APPARATUS FOR VARYING THE RATE OF SEED POPULATION

(76) Inventor: Edward H. Huffmeyer, 365 E. County Rd. 700 S., Greensburg, IN (US) 47240

( * ) Notice: Subject to any disclaimer, the term of this patent is extended or adjusted under 35 U.S.C. 154(b) by 0 days.

This patent is subject to a terminal disclaimer.

(21) Appl. No.: 10/224,845

(22) Filed: Aug. 21, 2002

(65) Prior Publication Data

US 2003/0047122 A1 Mar. 13, 2003

Related U.S. Application Data

(63) Continuation-in-part of application No. 09/733,264, filed on Dec. 8, 2000, now Pat. No. 6,463,866.
(60) Provisional application No. 60/169,637, filed on Dec. 8, 1999, provisional application No. 60/237,753, filed on Oct. 3, 2000, and provisional application No. 60/313,834, filed on Aug. 21, 2001.

(51) Int. Cl.[7] .............................. A01C 7/18; F16H 55/56
(52) U.S. Cl. .............................. 111/177; 111/903; 474/8
(58) Field of Search ................................. 111/17, 28, 32, 111/77, 177, 903, 904, 921; 474/8, 159; 60/571, 572, 553; 221/13

(56) References Cited

U.S. PATENT DOCUMENTS

| 966,303 | A | 8/1910 | Borlase |
|---|---|---|---|
| 3,299,637 | A | 1/1967 | Ballard |
| 3,579,989 | A | 5/1971 | Stark et al. |
| 3,807,248 | A | 4/1974 | Hooper |
| 4,078,504 | A | 3/1978 | Tye |
| 4,122,974 | A | 10/1978 | Harbert et al. |
| 4,455,812 | A | 6/1984 | James |
| 4,872,310 | A | 10/1989 | Kaye |
| 4,944,713 | A | 7/1990 | Salerno |
| 5,201,687 | A | 4/1993 | Friedmann |
| 5,646,846 | A | 7/1997 | Bruce et al. |
| 5,685,245 | A | 11/1997 | Bassett |
| 5,846,152 | A | 12/1998 | Taniguchi et al. |
| 5,941,789 | A | 8/1999 | McCarrick et al. |
| 5,956,255 | A | 9/1999 | Flamme |
| 6,036,616 | A | 3/2000 | McCarrick et al. |
| 6,379,275 | B1 | 4/2002 | Serkh |
| 6,537,166 | B1 * | 3/2003 | Adriaenssens et al. ......... 474/8 |

FOREIGN PATENT DOCUMENTS

WO    WO 86/04209    7/1986

OTHER PUBLICATIONS

John Deere Monitrol System, Feb. 22, 1988, pp. 1, 16 and 18, PC1603.

* cited by examiner

Primary Examiner—Thomas B. Will
Assistant Examiner—Nathan Mammen
(74) Attorney, Agent, or Firm—Clifford W. Browning; Woodard, Emhardt, Moriarty, McNett & Henry LLP

(57) ABSTRACT

An apparatus for varying the rate of seed population by planters or drills, comprising first and second squeeze jack variable speed pulleys, and a belt running around the pulleys; a cog mounted on the first pulley and a cog mounted on the second pulley, and a drive chain running around the cog mounted on the first pulley and a row unit chain running around the cog mounted on the second pulley; and apparatus to vary selectively the speed of the row unit chain at any given speed of the drive chain and at any slope of the apparatus above or below level ground.

4 Claims, 2 Drawing Sheets

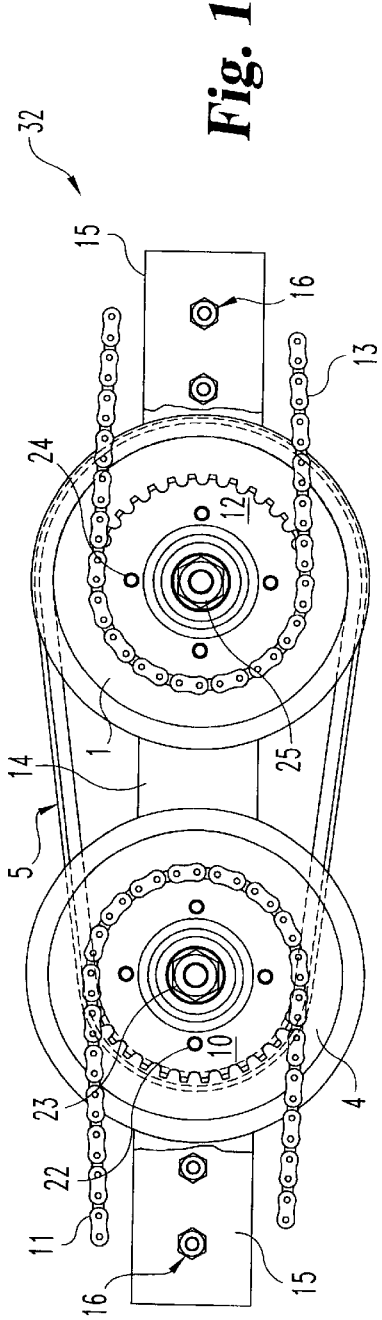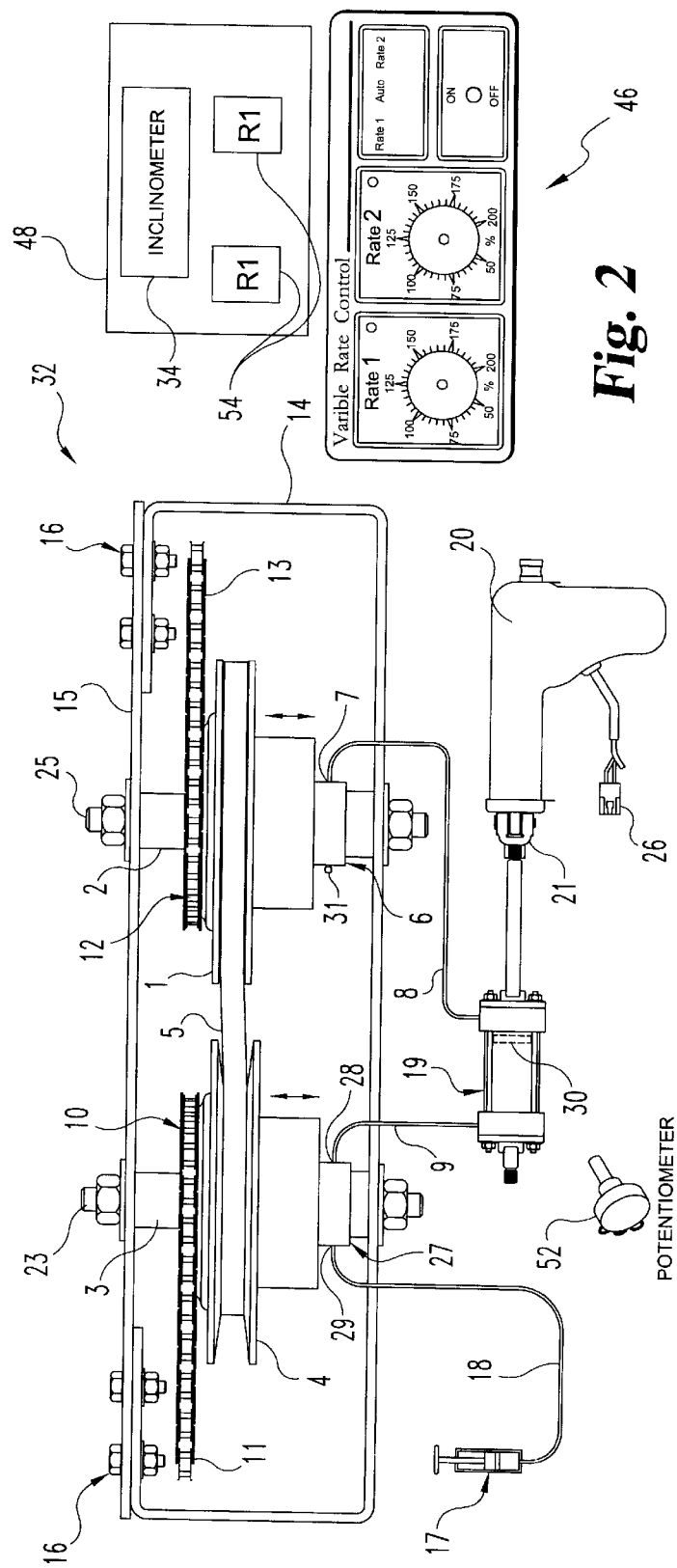

RATE 1 - 35K 1 TURN POT
RATE 2 - 35K 1 TURN POT
PISTON - 10K 10 TURN POT

INCLINOMETER-CONTROLLED APPARATUS FOR VARYING THE RATE OF SEED POPULATION

This application claims the benefits of prior co-pending provisional patent applications Serial Nos. 60/169,637 filed Dec. 8, 1999, 60/237,753 filed Oct. 3, 2000; and 60/313,834 filed Aug. 21, 2001; and is a continuation-in-part of prior non-provisional patent application Ser. No. 09/733,264 filed Dec. 8, 2000 now U.S. Pat. No. 6,463,866.

The material in the "computer program listing appendix" being filed herewith on two CD-ROMs, each identically containing the file d:\program files\picc\projects\level control\rate_controller.LST, created Aug. 13, 2002, and containing 1.3 MB is incorporated-by-reference as if fully set forth herein.

The present invention relates generally to systems for regulating the seed population rates by planters or drills, and more particularly to a novel apparatus that will vary the rate of seed population by planters or drills while they are in motion.

SUMMARY OF THE INVENTION

The apparatus for varying the rate of seed population by planters or drills of the present invention enables farmers to vary the rate of seed population by planters or drills of the prior art without stopping the planter to change the well-known planter-wheel-driven sprockets that now select the planter's seed population rate.

For example, a farmer will prefer to plant less corn seed on lighter soils, which are typically found on hillsides or slopes, and more corn seed on darker soils to thereby improving overall crop yields. When planting soybeans, on the other hand, just the opposite is true. A farmer would want to plant a heavier population of seeds on lighter soils and less on darker soils, because there would be less lodging of soybeans on the better soils.

Varying the seeding rate also enhances soil and water quality. For example, a stronger, healthier corn stalks on the hillside result from a lower seed population, and there is less soil erosion as a result. At the bottom of the hillsides, and on the flats, where the seed population is higher, water run-off is slowed because on the darker soils one gets a better plant. For soybeans, one would prefer having a heavier seed population on the hills, therefore, slowing water run-off.

The apparatus for varying the rate of seed population of the present invention accommodates a change from planting corn to planting soybeans or wheat, or any of the small grains, all without changing a sprocket on the planter or drill, as has been required in the prior art.

The apparatus of the present invention is also very safe for farmer-operators, because all changes may be made from the seat of the tractor that is pulling the planter.

The main goal of the present invention is to provide the farmer with means to place more or less seed in the most appropriate areas of the field, thereby saving money in seed cost and creating a better yield with less soil erosion.

A linear actuator that is connected to a hydraulic double rod cylinder controls the apparatus of the present invention. This enables the unit to select many different rates of seed population and to change the seed population rate at any point in time immediately. The actuator and the cylinder are located inside a single frame for the apparatus of the present invention, thereby making a compact unit that may be retrofitted to existing planters or drills.

The apparatus of the present invention may also be wired to a switch located in a tractor cab that controls the seeding population rate, or it can be wired to a seed population monitor for a planter or drill located in the tractor cab. The apparatus of the present invention is especially useful on a drill because a drill varies its seed population rate frequently due to the presence of different seed sizes and weights. The apparatus of the present invention allows the operator to correct this problem by holding a steady population rate using the switch or monitor. Therefore, the apparatus of the present invention can be used to hold the rate of seed population steady or get unlimited numbers of seed populations.

Another useful way to use the apparatus of the present invention is with fertilizer applications. Many times fertilizer population rates are varied according to soil types. The apparatus of the present invention could be used in many such applications that require speed variation.

This system could be equipped with a leveler. This would allow the apparatus to change seed population rates automatically as percent of ground slope increased and decreased. The apparatus could also be integrated with GPS which would allow mappings to illustrate where the apparatus of the present invention varied seed population rates, or GPS could be programmed to effect a change in seed population rates automatically.

One embodiment of the present invention is an apparatus for varying the rate of seed population by planters or drills, comprising, an apparatus for varying the rate of seed population by planters or drills, comprising a first and second squeeze jack variable speed pulleys, each having a top half and a bottom half, with the first pulley spinning about a first axis and the second pulley spinning about a second axis, a first oil-actuated squeeze jack affixed to the bottom half of the first pulley that moves the bottom half of the first pulley along its axis from a first position in which the first pulley is closed to a second position in which the first pulley is opened, and a second oil-actuated squeeze jack affixed to the bottom half of the second pulley that moves the bottom half of the second pulley along its axis from a first position in which the second pulley is closed to a second position in which the second pulley is opened, and a belt running around the pulleys; a drive cog affixed to the top half of the first pulley with a drive chain running around the drive cog, and a row unit cog affixed to the top half of the second pulley with a row unit chain running around the row unit cog; a double-rod oil cylinder in fluid communication in a closed system with the first and second squeeze jacks and having a piston therein that is movable between a first position at which the bottom half of the first pulley is in its second position and opened, and the bottom half of the second pulley is in its first position and is closed, and a second position at which the bottom half of the first pulley is in its first position and is closed, and the bottom half of the second pulley is in its second position and is opened; and means to move the piston between its first and second positions and to positions in-between wherein said means includes a linear actuator having a clevis that is attached to a double-rod cylinder and controlled by inclinometer monitor means that automatically actuates the linear actuator in response to changes in the slope of the apparatus above and below level ground.

Another embodiment of the present invention is an apparatus for varying the rate of seed population by planters or drills, comprising an apparatus for varying the rate of seed population by planters or drills, comprising a first and second squeeze jack variable speed pulleys, and a belt running around the pulleys; a cog mounted on the first pulley and a cog mounted on the second pulley, and a drive chain running around the cog mounted on the first pulley and a row unit chain running around the cog mounted on the second pulley; and means to vary selectively the speed of the row unit chain at any given speed of the drive chain wherein said means includes a linear actuator having a clevis that is attached to a double-rod cylinder and controlled by inclinometer monitor means that automatically actuates the linear actuator in response to changes in the slope of the apparatus above and below level ground.

Related objects and advantages of the present invention will be apparent from the following descriptions.

BRIEF DESCRIPTION OF THE DRAWING FIGURES

FIG. 1 is a partially segmented top view of the apparatus for varying the rate of seed population by planters or drills of the present invention.

FIG. 2 is a front view of the apparatus of FIG. 1.

DETAILED DESCRIPTION OF THE PREFERRED EMBODIMENTS

Figure 3:
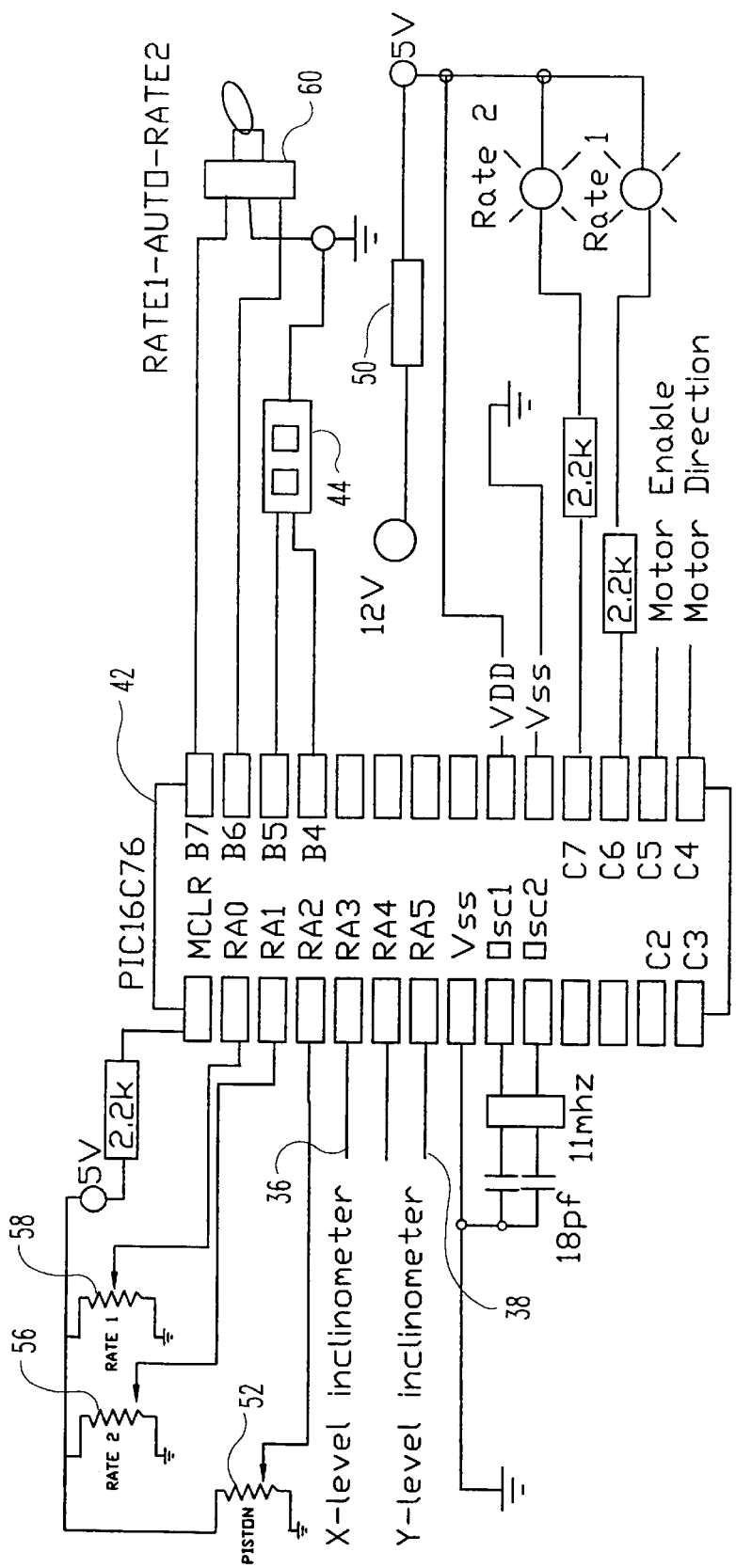
FIG. 3 is a schematic view of the rate controller circuitry of the preferred embodiment.

Referring now to the drawings, a preferred embodiment to date of the apparatus for varying the rate of seed population (32) of the present invention is illustrated in FIGS. 1 and 2.

The apparatus consists of a first 8.5-inch diameter squeeze jack variable speed pulley (1) and a second 8.5-inch squeeze jack variable speed pulley (4). A ⅞-inch belt (5) measuring 44 inches long is used to interconnect and power the two pulleys (1, 4). An oil actuated squeeze jack (6) on variable speed pulley (1) has an oil connector (7) through which oil activates the squeeze jack (6), making the lower half of the variable speed pulley (1) move either up or down in the view FIG. 2. A plug (31) allows excess oil to be drained from variable speed pulley (1). Variable speed pulley (4) has a corresponding squeeze jack (27) and an oil connector (28) that operate in the same ways.

Variable speed pulley (1) and variable speed pulley (4) are exactly the same size and operate the same way. A ¼ inch oil line (8) connects to the front port hole of double-rod oil cylinder (19), which has a ¾ inch bore, a 5/16 inch rod, and a 6 inch stroke, and holds approximately 2.190 cubic inches of oil. By contrast, squeeze jacks (6, 27) hold approximately 2.208 cubic inches of oil, each.

When cylinder (19) is charged with oil on both sides, its piston (30), located inside cylinder (19), should be in the center of the cylinder (19). Squeeze jacks (6, 27) are charged half full with approximately 1.104 cubic inches of oil each. Oil lines (8) and (9) are charged with oil also. A hand screw adjuster (17), which is a ½ inch threaded bolt, 3 inches long, threaded into a ½ inch cylinder with an o-ring, and oil line (18) connecting the adjuster to squeeze jack (27) through connector (29), are each charged with oil so that when hand screw adjuster (17) is tightened down it puts oil pressure on both squeeze jacks (6, 27), which then move the bottom halves of variable speed pulleys (1) and (4) (See FIG. 2) upward, closing each, and thereby tightening belt (5) between them.

When linear actuator (20), which is connected to clevis 21, which in turn is screwed onto cylinder (19), is retracted, there will be an increase in the seed population rate or speed, and when actuator (20) is advanced, the seed population rate or speed will be decreased, for the reasons that will be more fully explained below when the operation of the present invention is explained.

A drive cog (12), 5½ inch in diameter with 4 holes 5/16 inches each for stud bolts (24), is mounted to the variable speed pulley (1) on the side thereof opposite to squeeze jack (6). A drive chain (13) powers drive cog (12), and drive chain 13 is powered by a conventional wheel driven cog of a planter or drill (not shown). Thus, the speed of drive chain (13), and the corresponding rate of rotation of drive cog (12), will be directly proportional to the speed of the planter or drill over the ground. At any given ground speed of the planter or drill, the speed of drive chain (13) and the corresponding rate of rotation of drive cog (12) will remain constant.

A row unit cog (10), 5½ inch in diameter with 4 holes 5/16 inches each for stud bolts (22), is similarly mounted to variable speed pulley (4) and row unit chain (11) around the row unit cog (10) is connected to a conventional drive cog of the row units of a planter or drill. It is the rate of rotation of the conventional drive cog of the row units of a planter or drill that determines the speed or rate of seed population by the planter or drill.

A flat steel frame (14, 15) is provided in the preferred embodiment to date consisting of frame member (14) and frame bar (15). Frame member (14) is 3/16 inch thick and 3 inches wide flat steel that is bent on its four corners to measure 6¾ inches deep and 26¾ inches long. Frame bar (15) is 3/16 inch thick and 3 inch wide flat steel that is 26¾ inches long, with two trough holes at each end, one 1½ inches away from each end and the other 4 inches away from each end, for four bolts (16), each ⅝ inches wide and 1 inch long with nut sand lock washers, that hold frame member (14) and frame bar (15) together. Variable speed pulleys (1, 4) are mounted to frame bar (15) so as to be within the frame (14, 15), each being 8¾ inches from each end of the frame (14, 15), leaving the variable speed pulleys (1, 4) 10 inches apart. Actuator (20) and cylinder (19) are also to be mounted within frame (14, 15), but are shown outside the frame in FIG. 2 for clarity. It can be appreciated that frame bar (15) may be unbolted and taken off to make assembly and repairs convenient.

The four 5/16 inch stud bolts (22) hold cog (10) to variable speed pulley (4). One ⅝" bolt (23), threaded on both ends, holds variable speed pulley (4) to the flat steel frame (14, 15). Four 5/16 inch stud bolts (24) hold cog (12) to variable speed pulley (1). One ⅝-inch bolt (25), threaded on both ends, holds variable speed pulley (1) to flat steel frame (14, 15). Sleeve (3) is held by ⅝-inch bolt (23) next to frame (14, 15). A ⅝-inch bolt (25) holds sleeve (2) to the flat steel frame (14, 15).

Operation of the preferred embodiment of the apparatus of the present invention as illustrated in FIGS. 1 and 2 is as follows. When actuator (20), which is connected to cylinder (19), is retracted up to 6 inches, as illustrated in FIG. 2, piston (30) pushes all the oil that had been in the cylinder on the actuator side of piston 30 through oil line (8) and has filled squeeze jack (6), which pushes the lower half of variable speed pulley (1) upwards until variable speed pulley (1) is fully closed, as illustrated in FIG. 2. Belt 5 is then rotating about the outer circumference of variable speed pulley (1), as illustrated in FIG. 2.

At this point, piston (30) has also pulled oil through (9) oil line from squeeze jack (27) until all the oil is out of squeeze jack (27), and the oil is in cylinder (19), which is now full of oil. The lower half of variable speed pulley (4) moves downward until variable speed pulley (4) is fully open, as illustrated in FIG. 2. Belt (5) then slips within variable speed pulley (4), as illustrated in FIG. 2, is turning about a smaller radius, which has the effect of increasing the rate of rotation of the variable speed pulley (4). This operation in turn has the effect of increasing the rate of rotation of row unit cog 10, while the rate of rotation of drive cog 12 remains constant, which speeds up row unit chain 11, which in turn increases the speed or rate of seed population.

To decrease the speed or rate of seed population, actuator (20) is advanced and piston (30) will travel to the opposite end of cylinder (19) to that illustrated in FIG. 2. This pulls oil out of squeeze jack (6) through oil line (8) and into cylinder (19) thereby dropping the lower half of variable speed pulley (1) and thus opening it. This also pushes oil back through oil line (9) to squeeze jack (27), pushing the lower half of variable speed pulley (4) upward. This action closes variable speed pulley (4). As a result, belt 5 is squeezed outwardly to the outer circumference of variable speed pulley (4), while belt (5) slips within variable speed pulley (1) and thus turns about a smaller radius. Whereas variable speed pulley (1) continues to rotate at a constant rate, the effect of the foregoing actions is to decrease the rate of rotation of the variable speed pulley (4), which slows the rate of rotation of row unit cog (10), which slows down row unit chain 11, which in turn decreases the speed or rate of seed population.

In a manner similar to the forgoing examples, the actuator (20) may be stopped at any intermediary position to those discussed above to vary the speed or rate of population of seeds to any desired level between the positions of maximum increase and decrease discussed above.

An electrical sensor (26) on actuator (20) provides an electrical connection between the actuator (20) and a control unit that will enable a farmer to vary selectively the position of piston (30) within cylinder (19). For examples, the control unit might be a simple toggle switch, or a seed population monitor/controller, or a controller that would respond to the degrees of inclination of the planter or drill, or to a GPS controller that would vary seed population rates based on the GPS-determined location of the planter or drill in the field, any of which would be mounted in the cab of the tractor pulling the planter or drill.

INCLINOMETER MONITOR RATE CONTROLLER

In view of the fact that lighter soils are on hillsides and richer, darker soils are on level ground, it is beneficial to change seeding populations, as previously explained. The change in population helps limit soil erosion and creates a better quality crop. The apparatus for varying the rate of seed population, designed to change seeding rates on the go, can be equipped with an inclinometer, which is a leveling sensor unit, wired to a monitor to automatically change transmission rates according to the degree of slope. The inclinometer will be leveled with the implement. As the operator travels the fields, the degree of slope will be determined by the inclinometer and relayed to the monitor, so the transmission ratio can be changed automatically. Previously, the apparatus for varying the rate of seed population was changed by a toggle switch moved by the operator. Using this manual method, however, is not as accurate as using an inclinometer. The inclinometer makes the apparatus for varying the rate of seed population unique because the operator does not have to constantly look back at the implement to determine what slope is approaching and estimate exactly where to change seeding population. With the inclinometer attachment of the present invention, the change is determined and completed automatically, making for less stress and making the operation more safe.

The inclinometer of the present invention can be programmed to change at many different slopes. However, in the beginning it will be factory set two different degrees of slope for the automatic change. The first factory set level is from 0° to 2.4°, which is nearly level ground. The transmission ratio at this degree of slope is set by the operator. The second factory slope setting is 2.5° and above, and the transmission ratio will also be set by the operator. The transmission ratio predetermined by the operator is programmed into the monitor. In the beginning, this will be less confusing for the operation. There will also be an override so that the operator can change the transmission ratio manually. When in the automatic mode, the system changes according to the degree of slope, but when in the manual mode it is operated by a Rate 1 control pot or a Rate 2 control pot, the different populations being determined by the settings of the Rate 1 or Rate 2 pot depending on switch settings. Eventually as the operator gets more acquainted with the system, alternate levels and/or population rates can be selected according to preference.

The inclinometer, alone, can also be used with any piece of equipment that would be advantageous to control by degree of slope. The inclinometer connected to a population monitor will be able to display population changes. By connecting the monitor to a GPS system, the slope information, along with other collected data, can be stored and viewed later with mapping software.

An inclinometer can be put on a combine. When connected to a yield monitor and/or mapping software, it can provide the "degree of slope data" while harvesting. By comparing population maps during planting and yield maps during harvesting, the farmer will be able to determine optimal populations for different slopes. The inclinometer can also be used with equipment to determine standing population of different slopes.

Also, the inclinometer can be used on planters and drills that have dual seed hoppers. These planters or drills are capable of carrying two different types of seed. With an inclinometer attached, not only can the population rate be adjusted, but also the operator will have the capability of changing the type of seed automatically based on degree of slope. When connected with GPS, the "degree of slope data" can be collected along with population and seed type. This data can then be compared to collected harvest data.

When soil sampling with a GPS system the inclinometer is helpful in providing information on the degree of slope where the soil sample is taken. Also, the inclinometer can be used to change fertilizer rates and or herbicide rates based on degree of slope. If fertilizer and herbicide spreading equipment are equipped to handle more than one type of fertilizer or herbicide, the inclinometer can provide information to change not only rates but also types of fertilizer or herbicide.

Referring now to the drawings, the inclinometer (34), which is a leveling sensor circuit, is comprised of a pair of electronic clinometers that are mounted on a level plane and oriented so they are 90 degrees out of phase with each other. The clinometers output an analog voltage between 1 and 4 volts that is linear with the degree of slope. The voltage output is linear with the pitch (36) or yaw (38) of the printed circuit board (48) which the inclinometer (34) is mounted to. Motor relays (54) are also mounted on circuit board (48). The maximum angle that can be measured with the clinometers is a plus or minus 20 degrees. A microprocessor (42), with a 5-channel analog to digital converter, reads the analog voltage produced by the clinometers and calculates the angle of tilt. This information is then used by the processor (42)

that uses the data for decision-making calculations. The processor (42) includes software that averages the analog to digital readings from inclinometer (34) and calculates the angle. A 5- to 12-volt regulator circuit (50) is on board to supply regulated power to the clinometers and the microprocessor (42).

The microprocessor (42) has software program code embedded into the internal ROM (read only memory). A listing of the software code is in the "computer program listing appendix."

The microprocessor (42) has a built in 5 channel 8 bit analog to digital converter. The schematic for the circuit is shown in FIG. 3.

The software is written so that when switch (60) is set to "auto" mode (Binary 11) a variable controller (46) will actuate motor relays (54) that in turn actuate linear actuator (20) causing piston (30) to change ratio of the apparatus for varying the rate of seed population (32) so that the apparatus for varying the rate of seed population (32) will run at the ratio shown on Rate 1 control pot (58) or Rate 2 control pot (56). When in auto mode set by switch (60), Rate 1 control pot (58) will be selected as the control pot when the signal from inclinometer (34) is in "level" condition. When angle of incline from inclinometer (34) exceeds the trip level set by switch (44) then Rate 2 control pot (56) will be the control pot.

If switch (60) is set to Rate 1 (Binary 10), then the inclinometer (34) signal is ignored and the Rate 2 control pot (56) has no effect. Rate 1 control pot (58) adjusts ratio.

If switch (60) is set to Rate 2 (Binary 01), then the inclinometer (34) signal is ignored and the Rate 1 control pot (58) is ignored. The Rate 2 control pot (560 adjusts the ratio.

When installing the system, it is necessary to level the sensor using a bubble level or device suitable for adjusting the unit so that the inclinometer (34) is parallel with level ground.

Typical factory setting of the level trip point switch (44) would be:

| Binary Code | Angle |
|---|---|
| 00 | 0–1.5° |
| 01 | 1.6°–2° |
| 10 | 2.1°–2.9° |
| 11 | 3.0°–+ |

The controller console (46) reads the analog signal from the inclinometer (34) and compares the signal to a lookup table set by the operator by switch (44). The controller console (46) sends a 12-volt signal to control board (48) that actuates motor relays (54) that in turn adjust the ratio of the apparatus for varying the rate of speed population (32). The controller (46) can control the apparatus for varying the rate of seed population (32) so the ratio of input speed verses output speed can be decreased down to 50% and be increased up to +200%.

A typical example in auto mode set by switch (60) would be as follows. The controller (46) is monitoring a piston position (30) of cylinder (19) of the apparatus for varying the rate of seed population (32) with a potentiometer (52). The operator desires Rate 1 control pot (58) setting at a ratio of 120 percent on level ground. The controller would actuate the linear actuator (20) on the apparatus for varying the rate of seed population (32) so that the ratio of variable speed pulley (1) is at 120 percent. When the level sensor (34) is at an inclination above setting of switch (44), the Rate 2 control pot (56) is set for 140 percent. Then the variable rate controller (46) would send a signal to control board (48) that actuates motor relays (54) to adjust the ratio of the apparatus for varying the rate of seed population (32) to match the setting of Rate 2 control pot (56).

I claim:

1. An apparatus for varying the rate of seed population by planters or drills, comprising:

first and second squeeze jack variable speed pulleys, each having a top half and a bottom half, with the first pulley spinning about a first axis and the second pulley spinning about a second axis, a first oil-actuated squeeze jack affixed to the bottom half of the first pulley that moves the bottom half of the first pulley along its axis from a first position in which the first pulley is closed to a second position in which the first pulley is opened, and a second oil-actuated squeeze jack affixed to the bottom half of the second pulley that moves the bottom half of the second pulley along its axis from a first position in which the second pulley is closed to a second position in which the second pulley is opened, and a belt running around the pulleys;

a drive cog affixed to the top half of the first pulley with a drive chain running around the drive cog, and a row unit cog affixed to the top half of the second pulley with a row unit chain running around the row unit cog;

a double-rod oil cylinder in fluid communication in a closed system with the first and second squeeze jacks and having a piston therein that is movable between a first position at which the bottom half of the first pulley is in its second position and opened, and the bottom half of the second pulley is in its first position and is closed, and a second position at which the bottom half of the first pulley is in its first position and is closed, and the bottom half of the second pulley is in its second position and is opened; and means to move the piston between its first and second positions and to positions in-between wherein said means includes a linear actuator having a clevis that is attached to a double-rod cylinder and controlled by inclinometer monitor means that automatically actuates the linear actuator in response to changes in the slope of the apparatus above and below level ground.

2. The apparatus for varying the rate of seed population by planters or drills of claim 1 wherein said linear actuator has an electrical sensor that is connectable to a control for the actuator selected from the group consisting of a toggle switch, a seed population monitor, and a Global Positioning System monitor.

3. An apparatus for varying the rate of seed population by planters or drills, comprising:

first and second squeeze jack variable speed pulleys, and a belt running around the pulleys;

a cog mounted on the first pulley and a cog mounted on the second pulley, and a drive chain running around the cog mounted on the first pulley and a row unit chain running around the cog mounted on the second pulley; and means to vary selectively the speed of the row unit chain at any given speed of the drive chain wherein said means includes a linear actuator having a clevis that is attached to a double-rod cylinder and controlled by inclinometer monitor means that automatically actuates the linear actuator in response to changes in the slope of the apparatus above and below level ground.

4. The apparatus for varying the rate of seed population by planters or drills of claim 3 wherein said linear actuator has an electrical sensor that is connectable to a control for the actuator selected from the group consisting of a toggle switch, a seed population monitor, and a Global Positioning System monitor.

* * * * *